(12) United States Patent
Iguchi et al.

(10) Patent No.: US 7,751,176 B2
(45) Date of Patent: Jul. 6, 2010

(54) CERAMIC ELECTRONIC COMPONENT

(75) Inventors: Toshihiro Iguchi, Tokyo (JP); Akitoshi Yoshii, Tokyo (JP); Akira Goshima, Nikaho (JP); Kazuyuki Hasebe, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/137,810

(22) Filed: Jun. 12, 2008

(65) Prior Publication Data

US 2009/0009927 A1    Jan. 8, 2009

(30) Foreign Application Priority Data

Jul. 4, 2007    (JP) .............. 2007-176260

(51) Int. Cl.
    *H01G 4/06* (2006.01)
(52) U.S. Cl. ..................... 361/311
(58) Field of Classification Search .......... 361/311, 361/321.1, 321.2, 321.3, 321.4, 321.5
    See application file for complete search history.

(56) References Cited

U.S. PATENT DOCUMENTS 4,835,656 A * 5/1989 Kitahara et al. .......... 361/321.3
4,868,711 A * 9/1989 Hirama et al. .......... 361/321.3

FOREIGN PATENT DOCUMENTS

| JP | 5-121211 | 5/1993 |
|----|----------|--------|
| JP | 9-246017 | 9/1997 |
| JP | 11-340090 | 12/1999 |
| JP | 2000-124007 | 4/2000 |
| JP | 2001-44069 | 2/2001 |
| JP | 2001-143957 | 5/2001 |
| JP | 2004-128221 | 4/2004 |

* cited by examiner

*Primary Examiner*—Eric Thomas
(74) *Attorney, Agent, or Firm*—Oblon, Spivak, McClelland, Maier & Neustadt, L.L.P.

(57) ABSTRACT

A ceramic electronic component includes a ceramic body and an internal electrode layers disposed within the ceramic body. The ceramic body is covered with a diffusion layer, wherein said diffusion layer is an oxide layer into which at least a part of elements contained in the ceramic body are diffused and is located closer to a surface of the ceramic body than an outermost internal electrode layer.

2 Claims, 1 Drawing Sheet

CERAMIC ELECTRONIC COMPONENT

BACKGROUND OF THE INVENTION

1. Field of the Invention

The present invention relates to a ceramic electronic component.

2. Description of the Related Art

Ceramic capacitors are typical examples of ceramic electronic components, wherein a number of internal electrode layers are embedded in a ceramic body composed of, for example, $BaTiO_3$. The internal electrode layers are opposed to each other with an ultrathin ceramic layer interposed therebetween. The ceramic body includes outer layers at both sides in the thickness direction. The outer layers are sufficiently thicker than the ceramic layer interposed between the internal electrode layers. In addition, terminal electrodes that are continuous to the internal electrode layers are attached to both side faces in the length direction. The ceramic body is exposed externally at all the faces other than the side faces with the terminal electrodes attached thereto.

In ceramic electronic components of this type, as described above, since the surface of the ceramic body serves as an outer surface except the side faces with the terminal electrodes attached thereto, the ceramic body itself is required to have such a physical property as to resist cracking or breaking when subjected to an external impact.

However, ceramic electronic components of this type are manufactured such that a green chip (before firing) embedded with a number of internal electrode layers is fired and after firing, the terminal electrodes are attached thereto. At this firing step, there is a problem that mechanical strength is decreased due to insufficient firing of the outermost ceramic layer, easily causing cracking or breaking in the ceramic body.

As means for solving the above problem, Japanese Unexamined Patent Application Publication No. 2001-44069 discloses a technology that after formation of the external electrode (terminal electrode), the entire outer surface is coated with an oxide glass to form a glass coating layer, and then the glass coating layer is polished outside the electrode covering portion of the terminal electrode to exposed the surface of the terminal electrode.

In the above prior art, however, there is required a cumbersome, complicated process that after formation of the terminal electrode, a glass coating layer is formed by coating with an oxide glass and then the surface of the terminal electrode is exposed by polishing the glass coating layer outside the electrode covering portion of the terminal electrode. In addition, since the glass coating layer serves as a protective layer, the occurrence of cracking cannot be perfectly prevented because of the nature of glass.

In ceramic electronic components of this type, moreover, since the surface of the ceramic body serves as an outer surface except the side faces with the terminal electrodes attached thereto, the ceramic body has to be provided with not only sufficient moisture resistance but also the function of preventing a surface leakage current that will flow between the terminal electrodes. The surface leakage current occurs, for example, when an impurity adheres to the surface of the ceramic body between the terminal electrodes, and therefore, in order to prevent this problem, the ceramic body has to be provided with such a surface property that an impurity hardly adheres thereto. Particularly in recent ceramic electronic components, e.g., a ceramic capacitor, since the distance between the terminal electrodes is extremely shortened due to the rapid progress of miniaturization and slimming down, the surface leakage current easily occurs when an impurity adheres to the ceramic body exposed between the terminal electrodes.

There has been known no prior art that is aware of and discloses means for solving the above problem, including the above-identified Patent Document.

SUMMARY OF THE INVENTION

It is an object of the present invention to provide a ceramic electronic component that is sufficiently hard and highly resistant to cracking.

It is another object of the present invention to provide a ceramic electronic component that is highly resistant to moisture and hardly causes surface leakage current.

In order to achieve at least one of the above objects, the present invention provides a ceramic electronic component comprising:

a ceramic body;

internal electrode layers disposed within the ceramic body, wherein the ceramic body is covered with a diffusion layer, wherein the diffusion layer is an oxide layer into which at least a part of elements contained in the ceramic body are diffused and is located closer to a surface of the ceramic body than an outermost internal electrode layer.

With internal electrode layers being disposed within a ceramic body, as described above, the ceramic electronic component of the present invention satisfies the basic configuration required for ceramic capacitors, inductors, or composite components thereof.

The ceramic body is covered with a diffusion layer. The diffusion layer is an oxide layer into which at least a part of elements contained in the ceramic body are diffused. The diffusion layer can be hardened more than the ceramic body depending on the selection of the elements because the constituent elements of the oxide can be freely selected unlike in the case of the ceramic body whose constituent elements are limited to satisfy the required properties. Accordingly, the diffusion layer can effectively serve as a protective layer that prevents the occurrence of cracking in the ceramic body. The protective function of the diffusion layer is particularly effective in multilayer ceramic capacitors whose mechanical strength tends to decrease due to insufficient firing of the outermost ceramic layer.

With the selection of the elements constituting the diffusion layer, moreover, the moisture resistance can be improved and the adhesion of an impurity to the ceramic body can be prevented to suppress surface leakage current. The surface leakage current suppressing function of the diffusion layer is extremely useful in various chip components in which the distance between the terminal electrodes is extremely shortened due to the progress of miniaturization and slimming down.

The diffusion layer is located closer to a surface of the ceramic body than an outermost internal electrode layer. This configuration avoids the electrical effect of the diffusion layer on the internal electrode layers. Thus, while hardening, improvement of moisture resistance, and suppression of surface leakage current are aimed at with the diffusion layer, desired given electrical properties can be achieved by the internal electrode layers and the ceramic body.

As has been described above, the present invention has at least one of the following effects:

(a) To provide a ceramic electronic component that is sufficiently hard and highly resistant to cracking; and (b) To provide a ceramic electronic component that is highly resistant to moisture and hardly causes surface leakage current.

The present invention will be more fully understood from the detailed description given hereinbelow and the accompanying drawings which are given by way of illustration only, and thus not to be considered as limiting the present invention.

DESCRIPTION OF THE PREFERRED EMBODIMENTS

Figure 1:
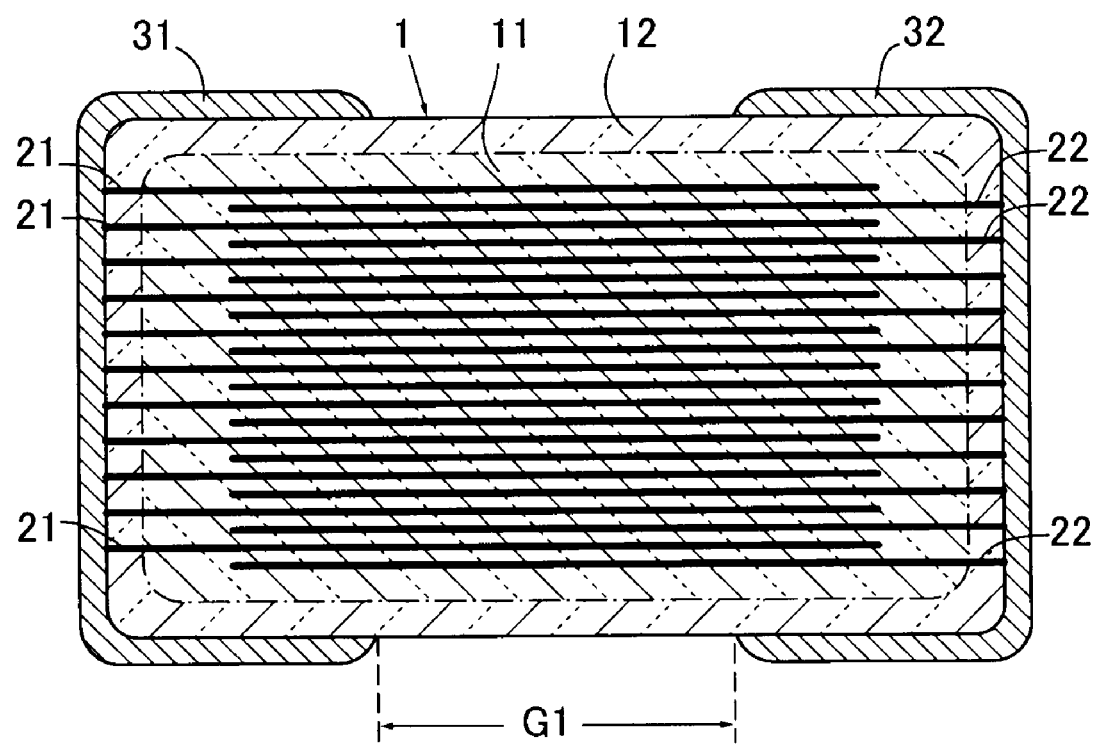
FIG. 1 is diagram schematically showing a ceramic electronic component according to one embodiment of the present invention.

In FIG. 1, a chip-like ceramic capacitor is shown as a typical example of ceramic electronic components of this type. Other examples include chip inductors, chip filters, chip resistors, chip varistors, and composite ceramic electronic components thereof.

The illustrated ceramic electronic component has internal electrode layers 21, 22 within a ceramic body 1. Since the present embodiment is a ceramic capacitor, the ceramic body 1 is composed of a $BaTiO_3$ ceramic. The internal electrode layers 21, 22 constitute a pair of capacitor electrode layers whose opposite ends are led to opposite end faces of the ceramic body 1 and connected to terminal electrodes 31, 32 formed thereon. The terminal electrodes 31, 32 are spaced a distance G1 apart from each other, so that the surface of the ceramic body 1 is exposed externally over the distance G1.

The ceramic body 1 is covered with a diffusion layer 12. The area surrounded by the diffusion layer 12 serves as an originally intended dielectric layer 11. The diffusion layer 12 is an oxide (metal oxide) layer into which at least a part of elements contained in the ceramic body 1 are diffused and located closer to the surface of the ceramic body 1 than outermost ones of the internal electrode layers 21, 22. That is, the uppermost internal electrode layer 21 and the lowermost internal electrode layer 22 have their opposite electrode portions inside the dielectric layer 11, while the diffusion layer 12 is located outside the dielectric layer 11. It should be noted that the dielectric layer 11 and the diffusion layer 12 are not clearly separated with such a definite boundary line (represented by an alternate long and short dash line) as shown in FIGURE, but there is an element diffusion gradient between them. In addition, the diffusion layer 12 is not necessarily required to extend all over the surface of the ceramic body 1. The diffusion layer 12 is only required to cover most of the exposed area of the ceramic body 1 between the terminal electrodes 31, 32.

With a plurality of the internal electrode layers 21, 22 being disposed within the ceramic body 1, as described above, the ceramic electronic component according to one embodiment of the present invention satisfies the basic configuration required for ceramic capacitors, inductors, or composite components thereof.

The diffusion layer 12 covering the ceramic body 1 is an oxide layer into which at least a part of elements contained in the ceramic body 1 are diffused. The diffusion layer 12 can be hardened more than the dielectric layer 11 depending on the selection of the elements because its constituent elements can be freely selected unlike in the case of the dielectric layer 11 whose constituent elements are limited to satisfy the required properties. Accordingly, the diffusion layer 12 can effectively serve as a protective layer that prevents the occurrence of cracking. The protective function of the diffusion layer 12 is particularly effective in multilayer ceramic capacitors whose mechanical strength tends to decrease due to insufficient firing of the outermost ceramic layer.

With the selection of the elements constituting the diffusion layer 12, moreover, the moisture resistance can be improved and the adhesion of an impurity such as a conducting particle to the ceramic body 1 can be prevented to suppress surface leakage current. The surface leakage current suppressing function of the diffusion layer 12 is extremely useful in various chip components in which the distance between the terminal electrodes is extremely shortened due to the progress of miniaturization and slimming down.

The diffusion layer 12 is located closer to the surface of the ceramic body 1 than outermost ones of the internal electrode layers 21, 22. This configuration avoids the electrical effect of the diffusion layer 12 on the internal electrode layers 21, 22. Thus, while hardening, improvement of moisture resistance, and suppression of surface leakage current are aimed at with the diffusion layer 12, desired electrical properties can be achieved by the internal electrode layers 21, 22 and the dielectric layer 11. In case of the ceramic electronic component according to the illustrated embodiment, a desired capacity can be obtained between the terminal electrodes 31, 32.

In case of a ceramic capacitor, the diffusion layer 12 may be formed such that a trace amount of material containing at least one element selected from the group consisting of Al, Si, Li and B is adhered to the surface of a green chip composed of a $BaTiO_3$ ceramic, followed by firing. With this, components contained in the $BaTiO_3$ ceramic constituting the ceramic body 1 are chemically diffusion-reacted with at least one element selected from the group consisting of Al, Si, Li and B, thereby forming the diffusion layer 12. For example, if $Al_2O_3$ particles are adhered to a green chip composed of a $BaTiO_3$ ceramic and then fired, the resulting diffusion layer 12 will contain $BaAl_2O_4$ as a main component.

The hardness of the diffusion layer 12, the improvement of cracking resistance and moisture resistance, and the surface leakage current suppressing function vary depending on the content of the element selected from the group consisting of Al, Si, Li and B in the diffusion layer 12. The content of the element selected from the group consisting of Al, Si, Li and B in the diffusion layer 12 is preferably at least 1.1 times that in other areas of the ceramic body 1, for example, in the dielectric layer 11. Within this range, the resulting diffusion layer 12 will be sufficiently hard, highly resistant to cracking and moisture, and hardly cause surface leakage current. The amount of elements constituting the diffusion layer 12 can be measured through an elemental analysis using EPMA (electron probe microanalyzer).

As means for adhering a material containing at least one element selected from the group consisting of Al, Si, Li and B to a green chip, there may be adopted immersing the green chip in a solution containing such an element or spraying such a solution on the green chip. There may also be adopted wet barrel finishing using a medium containing at least one element selected from the group consisting of Al, Si, Li and B, for example, a medium of $Ai_2O_3$, $SiO_2$, $LiO_2$ or $B_2O_3$, wherein the diffusion layer 12 can be provided with a desired layer thickness by adjusting the amount and particle size of the medium.

In any case, the diffusion layer 12 for preventing the occurrence of cracking can be formed more easily than the case using the technology disclosed in Japanese Unexamined Patent Application Publication No. 2001-44069.

While the present invention has been particularly shown and described with reference to embodiments thereof, it will be understood by those skilled in the art that various changes in form and detail may be made therein without departing from the spirit, scope and teaching of the invention.

What is claimed is:

1. A ceramic electronic component comprising:
   a ceramic body; and
   internal electrode layers disposed within said ceramic body,
   wherein said ceramic body is covered with a diffusion layer,
   wherein said diffusion layer is an oxide layer which is formed by diffusion reaction between a part of elements contained in said ceramic body and at least one element selected from the group consisting of Al and B in a surface area of said ceramic body.

2. The ceramic electronic component of claim 1, wherein a content of said element selected from the group consisting of Al and B in said diffusion layer is at least 1.1 times that in other areas of said ceramic body.

* * * * *